United States Patent [19]
Chubb

[11] Patent Number: 4,913,225
[45] Date of Patent: Apr. 3, 1990

[54] LIQUID SHEET RADIATOR APPARATUS

[75] Inventor: Donald L. Chubb, Olmsted Falls, Ohio

[73] Assignee: The United States of America as represented by the Administrator, National Aeronautics and Space Administration, Washington, D.C.

[21] Appl. No.: 244,377

[22] Filed: Sep. 15, 1988

[51] Int. Cl.$^4$ ................................................. F8 15/00
[52] U.S. Cl. ............................... 165/104.31; 165/41; 165/904; 239/597; 239/601; 244/163
[58] Field of Search ............... 165/104.31, 41, 904; 244/163; 239/597, 601

[56] References Cited

U.S. PATENT DOCUMENTS 4,702,309 10/1987 Frank .................................... 165/41

Primary Examiner—Albert W. Davis, Jr.
Attorney, Agent, or Firm—Gene E. Shook; James A. Mackin; John R. Manning

[57] ABSTRACT

An external flow, liquid sheet radiator apparatus adapted for space applications has as its radiating surface a thin stable liquid sheet formed by fluid flow through a very narrow slit affixed to the sheet generator.

6 Claims, 5 Drawing Sheets

LIQUID SHEET RADIATOR APPARATUS

ORIGIN OF THE INVENTION

The invention described herein was made by an employee of the U.S. Government and may be manufactured and used for the Government for governmental purposes without the payment of any royalties thereon or therefor.

TECHNICAL FIELD

The invention relates generally to radiators. The invention is particularly directed to an improved external flow liquid sheet radiator (LSR) apparatus adapted to space applications having a very low mass, a simple design, and a specific power virtually the same as existing droplet radiators.

Present external flow radiators including the liquid droplet radiator (LDR) and the liquid belt radiator (LBR) have complex designs, and inherent deployment difficulties. The present inventive concept eliminates the containing walls for the working fluids thereby greatly reducing the mass compared to a typical pumped loop or heat pipe radiator. The working fluid in this novel system is thus exposed to the vacuum conditions of space. The LSR of the present invention uses a thin ($\sim 100$ $\mu$m) liquid sheet as the radiating surface. Similar to existing external flow radiators, the working fluid of the present LSR must have a very low ($\sim 10^{-8}$ torr) vapor pressure in order to keep evaporative losses low.

It will be appreciated that an advantage of the LSR is its ease of design. Fabrication of narrow slits that are used in producing the novel sheet flow does not require precision machining techniques similar to those necessary for fabricating the plurality of small holes of a liquid drop radiator system.

It will further be appreciated that another important advantage of the liquid sheet radiator is its relatively lower pump power requirement since the viscous losses of the LSR is considerably less than the losses for the many small holes of a LDR.

Still another important advantage of the LSR is its simplified collection system since the liquid sheet flow pattern coalesces to a point. Thus only a small cross-sectional area collector, which does not have to contend with stream misalignment, is required.

Hence, the simpler design of the novel LSR generator and collector translates into lower mass for these components than for existing LDR and LBR systems.

Furthermore, the specific power of the LSR for the sheet (power radiated/sheet mass), it will be appreciated, is approximately the same as the specific power for a comparable droplet design.

It is, therefore, an object of the invention to provide an improved external flow radiator adapted to space applications.

Another object of the invention is to provide a radiator having a significantly low mass and simple design.

Yet another object of the invention is to provide a radiator that uses a thin liquid sheet as the radiating surface.

Still another object of the invention is to provide a system that is easily deployable.

Yet another object of the invention is to provide a radiator that uses a novel collection system for receiving the working fluid.

BACKGROUND ART

U.S. Pat. No. 4,572,285 to Botts et al discloses a magnetically focussed liquid drop radiator wherein a dipole magnet is used to focus the liquid droplets for reception by a collector. A droplet generator is mechanically connected to a piezoelectric oscillator to produce the liquid droplets.

U.S. Pat. No. 3,363,676 to Hunter, Jr. is directed to a heat radiator for providing radiation of heat, utilizing a liquid metal or another liquid collant.

U.S. Pat. No. 3,239,164 to Rapp discloses a space radiator system including a plurality of independent, small size radiator systems.

U.S. Pat. No. 3,490,718 to Vary discloses a capillary radiator adapted for planetary space applications and including a core unit having capillary passages therein through which heat transfer fluid flows.

DISCLOSURE OF THE INVENTION

According to the present invention, an external flow radiator adapted to space applications has as its radiating surface a thin stable liquid sheet formed by forceably causing a fluid to flow through a very narrow slit. As a result of surface tension forces, the sheet has a triangular shape and is collected into a simply designed collector positioned at the apex of the triangle. The specific power for the liquid sheet is virtually the same as the droplet sheet specific power.

BRIEF DESCRIPTION OF THE DRAWINGS

The foregoing as well as other objects, features and advantages of this invention will become more apparent in the following detailed description when taken in conjunction with the appended figures in which.

BEST MODE OF CARRYING OUT THE INVENTION

Figure 1:
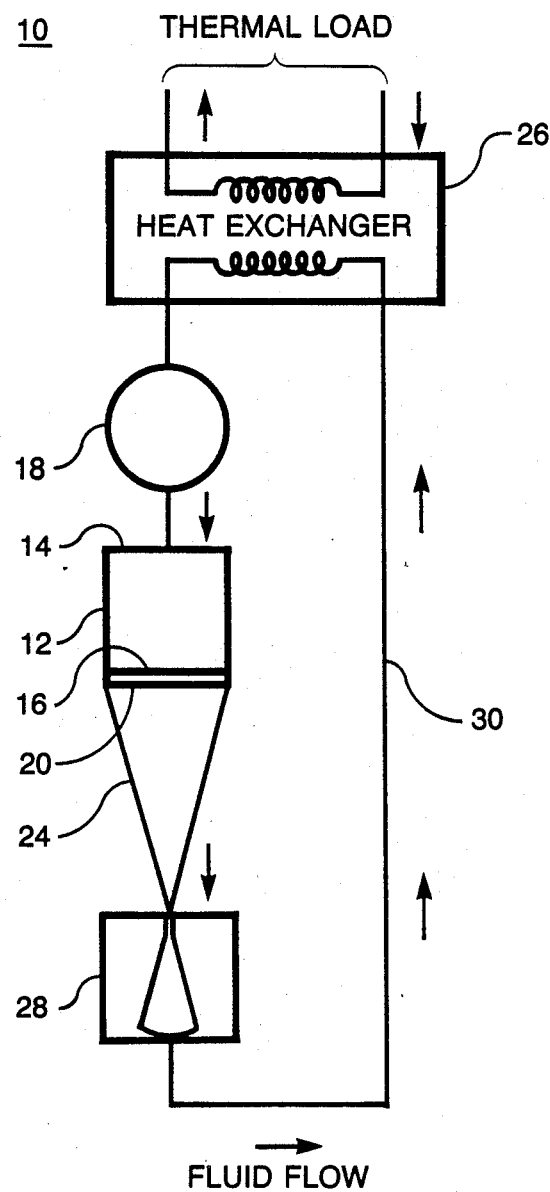
FIG. 1 is a schematic view of the liquid sheet radiator (LSR) apparatus.

Referring now to the drawings, there is shown in FIG. 1 a schematic view of the liquid sheet radiator (LSR) apparatus 10. The LSR 10 is comprised of a generator 12 having an axial bore therethrough and a rear face 14 and frontal face 16 for respectively receiving and discharging a working fluid containing heat absorbed from a body. Rear face 14 and frontal face 16 are registerably aligned to minimize fluid flow turbulance through the generator 12. The working fluid, which is forceably passed through the apparatus 10 by pump 18, comprises silicon oils or liquid metals.

A unique feature of the invention is a plate 20, fabricated from a machineable metal, having a slit 22 (as shown in perspective view in FIG. 2) therein fixedly mounted to the frontal face 16 of the generator 12. Tapered walls of plate 20 enable the fluid flow to be directed into the slit 22. The slit 22 is used to form the liquid sheet 24 (shown in FIG. 1) as the fluid is forced from a liquid reservoir 26 through generator 12 and slit 22.

Figure 2:
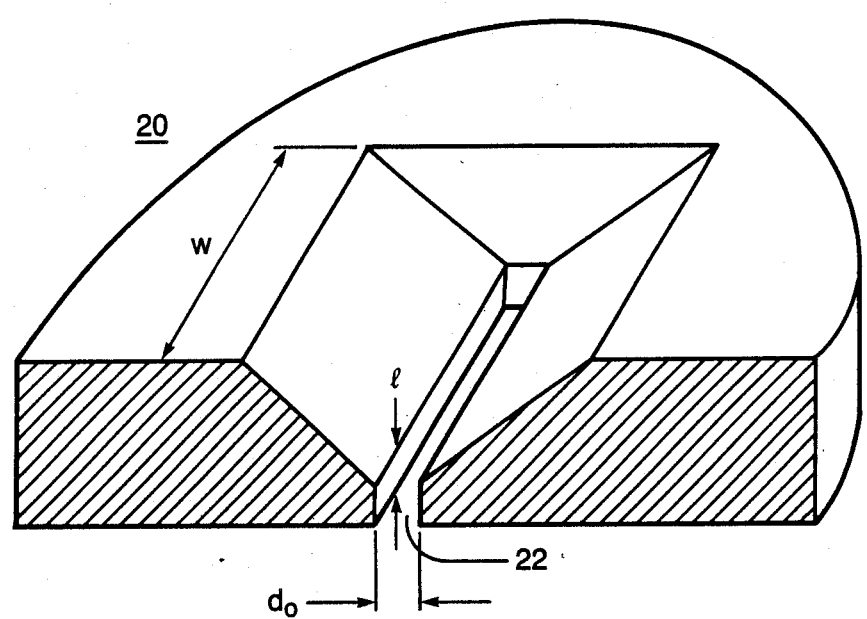
FIG. 2 is a perspective view of the slit geometry.

As can be seen in FIG. 2, the slit 22 has a width, w, a thickness, $d_o$, and a length, l. A 45° taper to the slit length (l) enables low $l/d_o$'s to be milled, while simultaneously preserving the integrity of the slit 22. A slit 22 having a $l/d_o$ of greater than about 3 is preferred since sheet flow behaves most ideally at this level. It is determined that uniform fluid flow velocity exiting the slit 22 is achieved at or above this preferred $l/d_o$.

A preferred slit thickness, $d_o$, of about less than 300 μm for silicon oils produces surface tension dominated flow critical to the present invention. In order to achieve surface tension dominated flow, the dimensionless parameter called the Weber number, $W_e$, must be less than about 1,000. The Weber number is defined as, $$W_e = \frac{\rho v_o^2}{\sigma} d_o$$

Where $\rho$ is the fluid density, $v_o$ is the fluid velocity, $\sigma$ is the fluid surface tension, and $d_o$ is the slit thickness. Therefore, for $W_e \leq 1,000$, $$d_o = \frac{10^3}{v_o^2}\left(\frac{\sigma}{\rho}\right)$$

For the silicon oils of the present invention, $$\frac{\sigma}{\rho} \approx 1/3 \times 10^{-4} m^3/sec^3$$

and $\bar{v}_o \approx 10$ m/sec. Hence, the preferred slit thickness, $d_o$, resulting from the fluid parameters of the present invention is $$d_o \leq \frac{10^{-3}m}{3} = 300 \text{ μm}.$$

Surface tension dominated flow for liquid metals is achieved with larger slit thickness, $d_o$, since they have larger surface tension than the oils. For instance, with liquid lithum, the metal with the largest $\sigma/\rho$, the thickness can be as large as $$d_o \leq 0.7 \text{ cm} = 7000 \text{ μm}.$$

Approximate maximum $d_o$'s of select liquid metals for sustaining surface tension dominated flow, critical to the present invention, are recited in the Table below, to wit:

| MATERIAL | DENSITY GM/CM$^3$ | SURFACE TENSION DYNE/CM$^2$ | APPROPRIATE MAXIMUM SLIT THICKNESS FOR SURFACE TENSION DOMINATED FLOW $d_O$, μm |
|---|---|---|---|
| Gallium | 6 | 740 | 1200 |
| Indium | 7 | 600 | 850 |
| Lithium | .5 | 350 | 7000 |
| Tin | 6.8 | 550 | 800 |
| Bismuth | 10 | 370 | 350 |
| Lead | 10.5 | 420 | 400 |
| Aluminum | 2.3 | 900 | 3900 |
| Dow-Corning 705 Oil | 1.1 | 37 | 300 |

It should therefore be appreciated by those skilled in the art that the preferred slit thickness, $d_o$, for producing the critical surface tension dominated flow, is determined by the aforementioned fluid parameters and a Weber number, $W_e$, of less than about 1,000. Thus, alternative slit thicknesses, $d_o$, are possible which correspond to the range of preferred working fluids and Weber number of the present invention.

Figure 3:
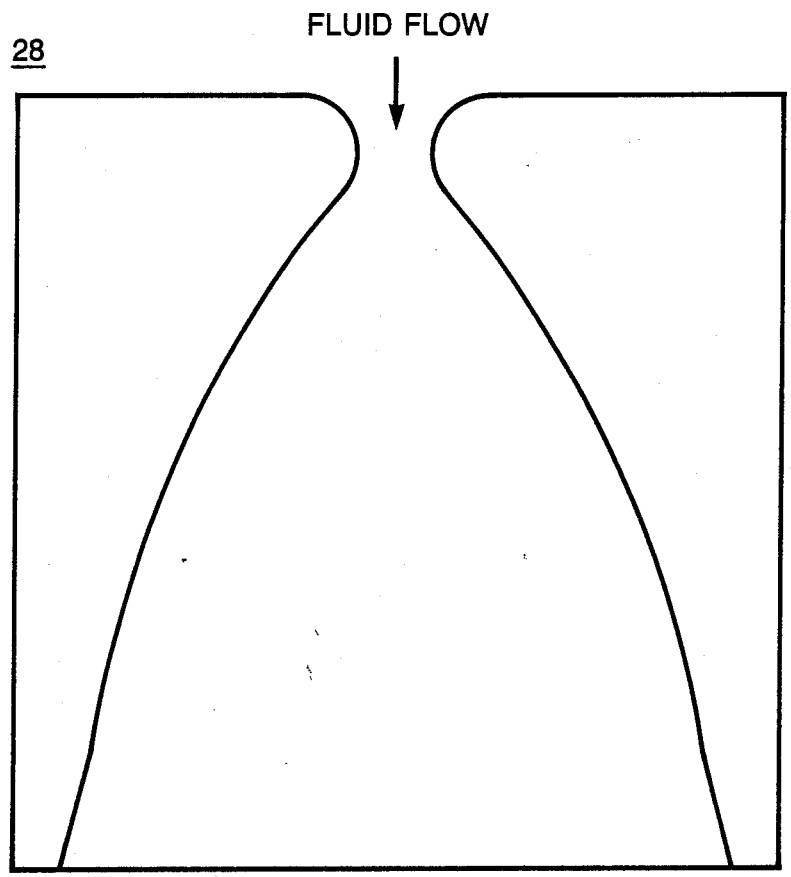
FIG. 3 is a cross-sectioned view of the collector.

Turning now to the fluid collection, a collector 28 is located in registered alignment with generator 12. The collector 28 receives the liquid sheet 24 flow. Collection of the liquid sheet 24 flow is simplified since the sheet 24 flow coalesces to a point. Thus, only a small cross-sectional area collector 28, which does not have to contend with stream misalignment, is required. The collector 28, moreover, has curved walls as can be clearly seen in FIG. 3, so that it will act as a diffuser, converting the flow kinetic energy to a total pressure. It should be appreciated that simpler design of the LSR generator 12 above and the collector 28 together translates into lower mass for these components than for the LDR and LBR systems. Thus, the LSR 10 is far better suited for deployment and maneuverability in a space environment.

Continuous operation, another important LSR 10 feature is achieved with a recirculating means 30 which draws the fluid from the collector 28 and returns it to the liquid reservoir 26.

Figure 4:
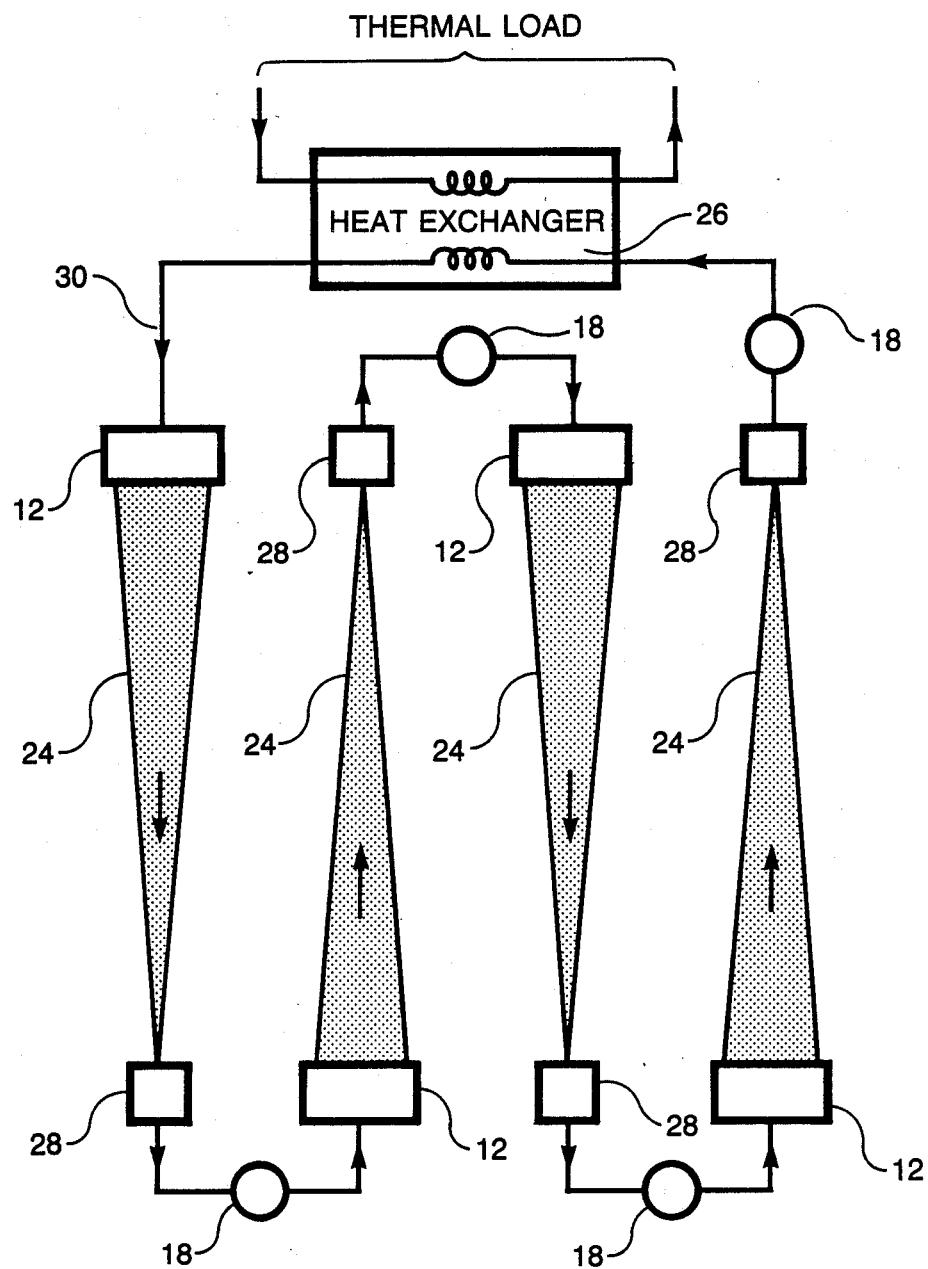
FIG. 4 is a schematic view of a series connected LSR.
Figure 5:
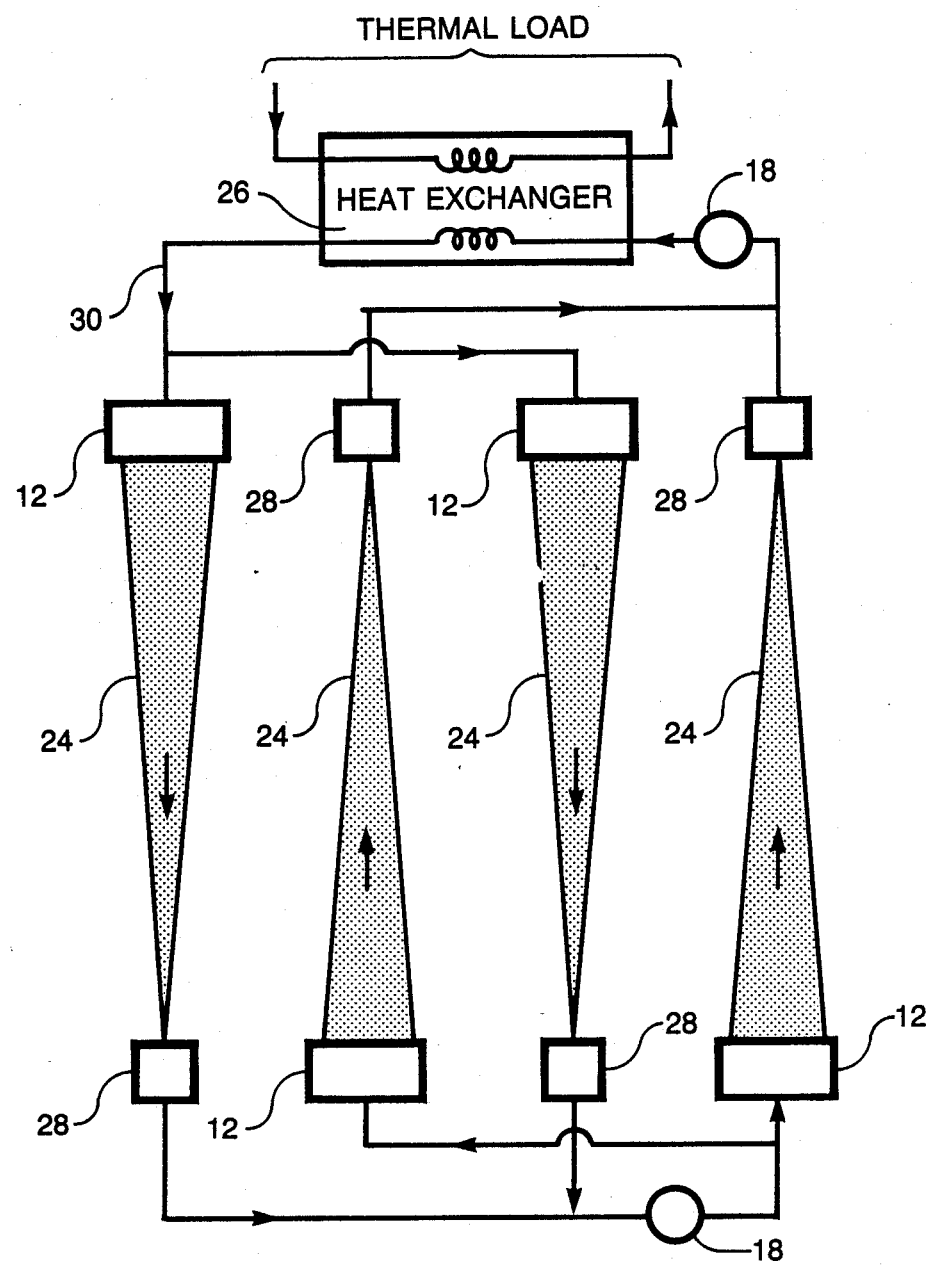
FIG. 5 is a schematic view of a parallel connected LSR.

It should be appreciated to one skilled in the art, that alternative configurations of the LSR apparatus 10 are possible. For instance, the members may be arranged in series as shown in FIG. 4 or arranged in parallel as shown in FIG. 5. Still further, a combination of series and parallel connected members is possible.

While the invention has been described with reference to certain preferred embodiments thereof, those skilled in the art will appreciate that various modifications, changes, omissions, and substitutions may be made without departing from the spirit of the invention. It is intended, therefore, that the invention be limited only to the scope of the following;

What is claimed is:

1. A liquid sheet radiator apparatus connected to reservoir containing a liquid working fluid that exposes a triangular sheet of said working fluid to the vacuum of space without containing walls comprising:
    a generator means including
        a body having an axial bore therethrough for conveying said liquid working fluid,
        a rear face on said body having an opening therethrough correspondingly aligned with said bore; and
        a frontal face with an opening therethrough correspondingly aligned with said bore;
    (b) a plate having a slit therein rigidly mounted on said frontal face, said slit having an opening therethrough and said opening being correspondingly aligned with said bore to provide a predetermined fluid flow pattern;
    (c) a pump for forcibly passing a fluid from said reservoir through said generator means and said plate thereby producing said triangular liquid sheet;
    (d) a collector registerably aligned with said frontal face and spaced therefrom for receiving said discharged liquid sheet which coalesces therein; and
    (e) means for recirculating said fluid from said collector to said reservoir.

2. The apparatus as claimed in claim 1 wherein said slit has a thickness, $d_o$, of about less than 300 μm for silicon oils for sustaining maximum surface tension dominated fluid flow.

3. The apparatus as claimed in claim 1 wherein said generator rear face and said frontal face are registerably aligned so that fluid flow turbulance is minimized.

4. The apparatus as claimed in claim 1 wherein said plate comprises a machineable metallic material.

5. The apparatus as claimed in claim 1 wherein said slit has a length (l): thickness ($d_o$) ratio of at least about 3 for uniform fluid flow velocity exiting said slit.

6. The apparatus as claimed in claim 1 wherein said liquid working fluid is selected from the group consisting of:
(a) organic silicon oils; and,
(b) liquid metals.

* * * * *